INVENTOR.
RALPH W. LOTZ
BY W. G. Sullivan
ATTORNEY

Patented July 20, 1954

2,683,900

UNITED STATES PATENT OFFICE 2,683,900

METHOD FOR EXTRUDING ARTICLES

Ralph W. Lotz, Mayfield Heights, Ohio, assignor to The Apex Electrical Manufacturing Company, Cleveland, Ohio, a corporation of Ohio Application February 19, 1952, Serial No. 272,422

3 Claims. (Cl. 18—56)

This invention relates to methods for extruding articles comprising glass fibres and a bonding agent, and more particularly to forming articles of this type which are relatively rigid and have considerable strength.

According to the invention, a vertically movable mandrel is adapted to be internally heated and to telescope within a cooperating lower die also adapted to be internally heated and providing an annular zone between the mandrel and die. A mat of relatively short glass fibres held together by a binding agent is disposed to encircle the mandrel and the lower end of the mat is drawn inwardly and clamped to the lower end of the mandrel. The lower end of the mandrel is projected slightly within the die, and a liquid bonding agent is placed in an annular well formed between the mat and the upper portion of the die. Both the mandrel and die are heated and the mandrel is forced through the die so that the entire length of the mat is disposed beneath the die. As the mat progresses through the die the bonding agent hardens so that by the time the entire mat has passed through the die the mat fibres are compressed and interlocked by the bonding agent to provide a relatively rigid high strength wall for the article. Means are provided for engaging the upper end of the extruded or formed article after it has passed through the die whereby upon retracting the mandrel in an upward direction the formed article is stripped from the mandrel.

The above described process relates to forming a tubular article, and in a modification of the invention, a process is disclosed for forming a solid article comprising glass fibres and a bonding agent. In this modification a mat of relatively short glass fibres initially interlocked by a suitable binding agent may be of rectangular cross section. The lower portion of the mat is projected through a heated die and grasped by suitable clamp means beneath the die and a liquid bonding agent is supplied to a well formed by the upper portion of the die and the mat. The mat is then drawn through the die which compresses the fibres and hardens the bonding agent by heat whereby a relatively rigid and high strength solid article is formed.

It is a primary object of the invention to provide methods for extruding relatively rigid and high strength articles comprising glass fibres and a bonding agent.

Another object of the invention is to produce a relatively rigid and high strength article comprising relatively short glass fibres and a heat hardenable bonding agent by heating the bonding agent while the fibres are being forced through a forming die.

Another object of the invention is to provide methods for extruding relatively rigid and high strength articles comprising relatively short glass fibres and a heat hardenable resin.

Other objects of the invention and the invention itself will become increasingly apparent from a consideration of the following description and drawings, wherein.

Figure 1:
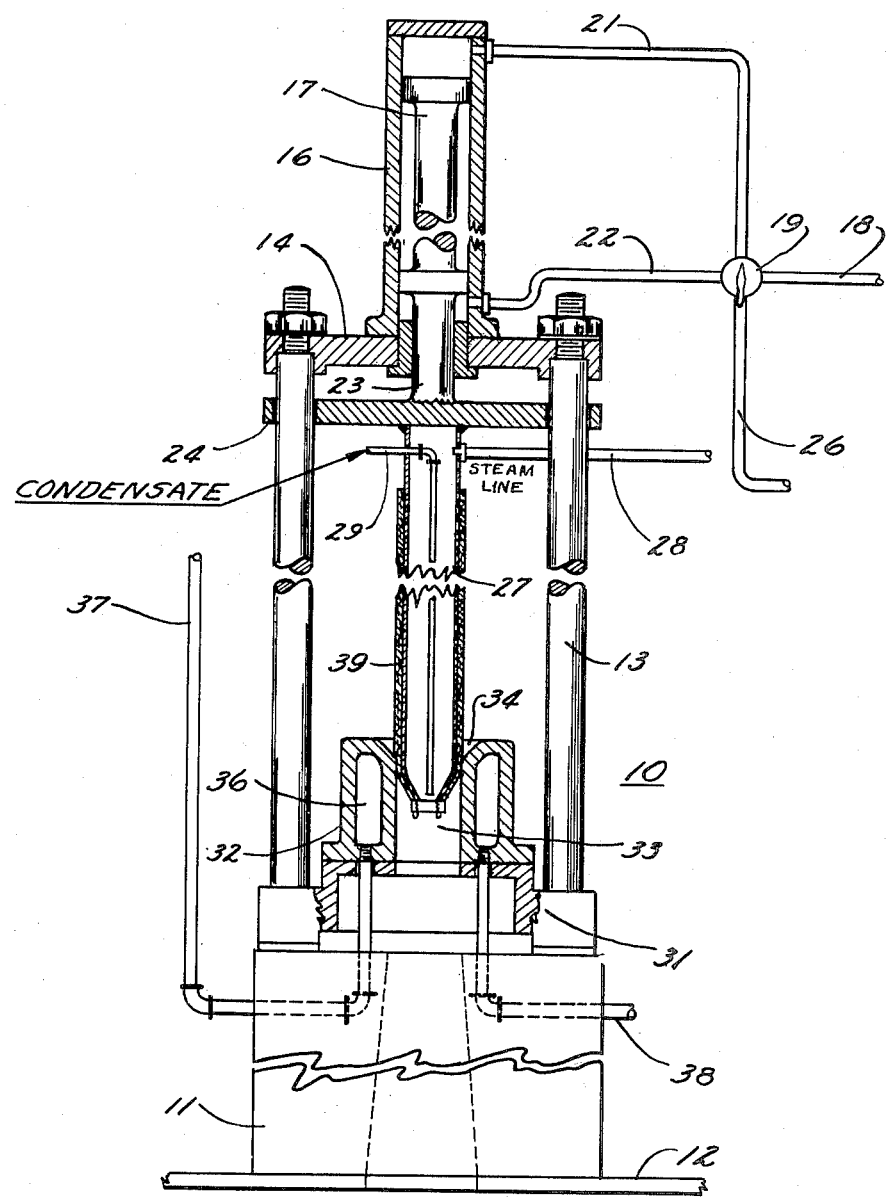
Figure 1 is an elevational view, largely diagrammatic, of apparatus which I may employ in forming a tubular article.
Figure 2:
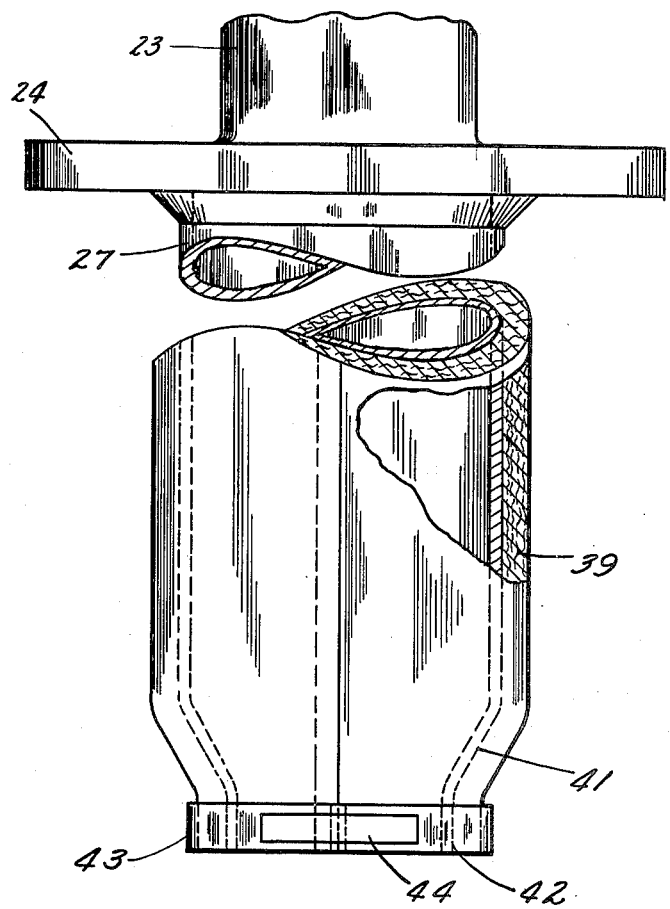
Figure 2 is a fragmentary view, partially in section, showing the manner in which the fibre mat is clamped to the mandrel.
Figure 3:
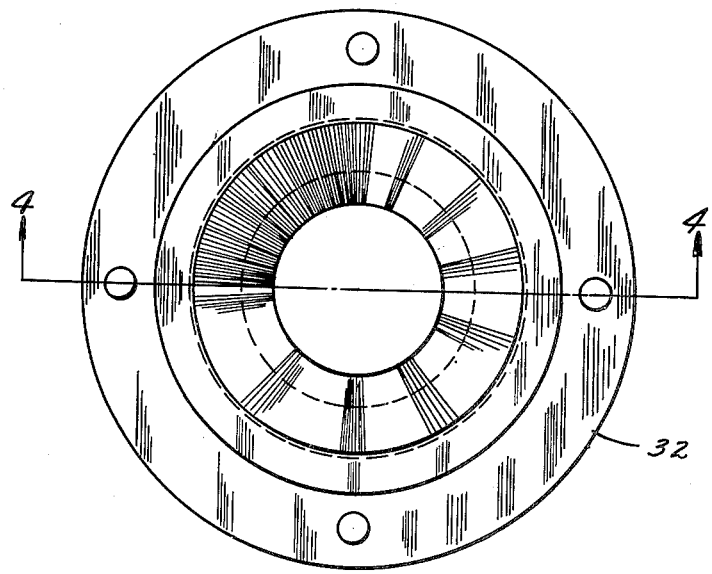
Figure 3 is a top plan view of a die which I may employ.
Figure 4:
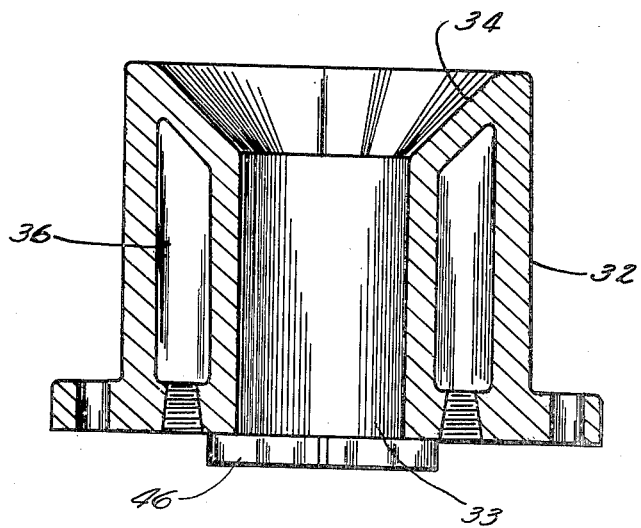
Figure 4 is a vertical, sectional view of the die taken along the line 4—4 of Figure 3.

Referring now to the drawings, and particularly Fig. 1, I have indicated a hydraulic press generally at 10. The press comprises a relatively heavy base 11 firmly supported on a floor 12, the base and floor having aligned openings therein to accommodate the downward travel of a mandrel. A plurality of guide columns 13 extend upwardly from base 11 to a cross arm 14 which supports a cylinder 16. A piston 17 in cylinder 16 is movable in opposite axial directions in a conventional manner by differential hydraulic pressure acting on opposite faces of the piston. Liquid under pressure is supplied from a line 18 through a two-way valve 19 to lines 21 and 22 communicating with the cylinder at points beyond the maximum piston travel. A piston stem 23 extends through suitable packing to a transverse guide bar 24. A return line 26 extends from valve 19 to a liquid reservoir (not shown) whereby as the two-way valve is actuated, liquid under pressure will be transmitted to one end of the cylinder and exhausted from the opposite end to actuate piston 17.

Supported from guide bar 24 in any suitable manner is a hollow or tubular mandrel 27 closed at its upper and lower ends. A steam line 28 is connected to the mandrel and has a flexible portion of sufficient length to permit the line to travel therewith and a condensate line 29 is similarly connected to the mandrel, the line 29 extending internally of the mandrel to a point adjacent the bottom thereof to exhaust any condensate which may collect in the bottom portion of the mandrel. A mounting block 31 on press base 11 is adapted to have a die 32 securely bolted or otherwise fixed thereto. The die in this instance is formed with a cylindrical bore 33 terminating upwardly in an outwardly inclined circular wall 34. The die is formed with an annular steam space 36 communicating with a steam supply line 37 and a condensate exhaust line 38.

A fibre mat, indicated at 39, preferably formed of glass fibers, comprises a mass of relatively short fibres, such as two inches in length, locked together by a suitable binding agent such as a thermosetting resin. Resins of this type may be applied in liquid or powdered form and harden upon the application of heat. The lower wall of mandrel 27 is tapered inwardly, as indicated at 41, to merge with a reduced diameter end portion 42. The mat 39 is disposed to encircle the mandrel and the edge portions thereof may be clipped together or glued together with a slight overlap. The lower portion of the mat is clamped to the lower end of the mandrel in any suitable manner as by a ring 43 having its ends held together by a lock bar 44 of U form having inturned ends adapted to engage slots cut in ring 44. Any clamping means which will clear the bore 33 of die 32 may be used.

In forming a cylindrical tube the mat is disposed on the mandrel in the manner described, the mandrel 27 and the die 32 are either heated or maintained heated, preferably by steam, at a temperaure which will cause the resin being used to harden in a relatively short time, the lower portion of the mandrel and encircling mat is pressed partially into die 32 (as indicated in Fig. 1) and liquid resin is poured into the annular well formed by the outer surface of mat 39 and the inclined wall 34 of the die, and the mandrel is moved downwardly until the mat has passed completely through the die. A split collar or the like 46 is then placed around mandrel 27 and in abutting relation with the top edge of the mat or extruded cylindrical tube and the mandrel is drawn upwardly whereby the pressure of collar 46 against the lower surface of the die surrounding bore 33 will strip the tube from the mandrel. I preferably employ a thermosetting resin which will permanently set or harden during the time a portion of the mat impregnated with the resin travels the length of the die bore 33. However, I have found that although a resin of this type quickly hardens when subjected to pressure and heat at opposite sides of the mat by the mandrel and die that the resin in the well remains liquid during the extruding operation. For economy of operation, I preferably employ a relatively long mat and if short tubes are desired, the extruded tube can be easily sawed to provide the proper length tubes. The length of the extruded tube is governed primarily by the vertical space available for travel of the mandrel and its associated piston. Although I have described a method of extruding a cylindrical tube, it is understood that tubular articles having cross sections of varying shape may be formed in a similar manner by suitably shaping the mandrel and die so long as the cross section of the article is uniform throughout its length.

Figure 5:
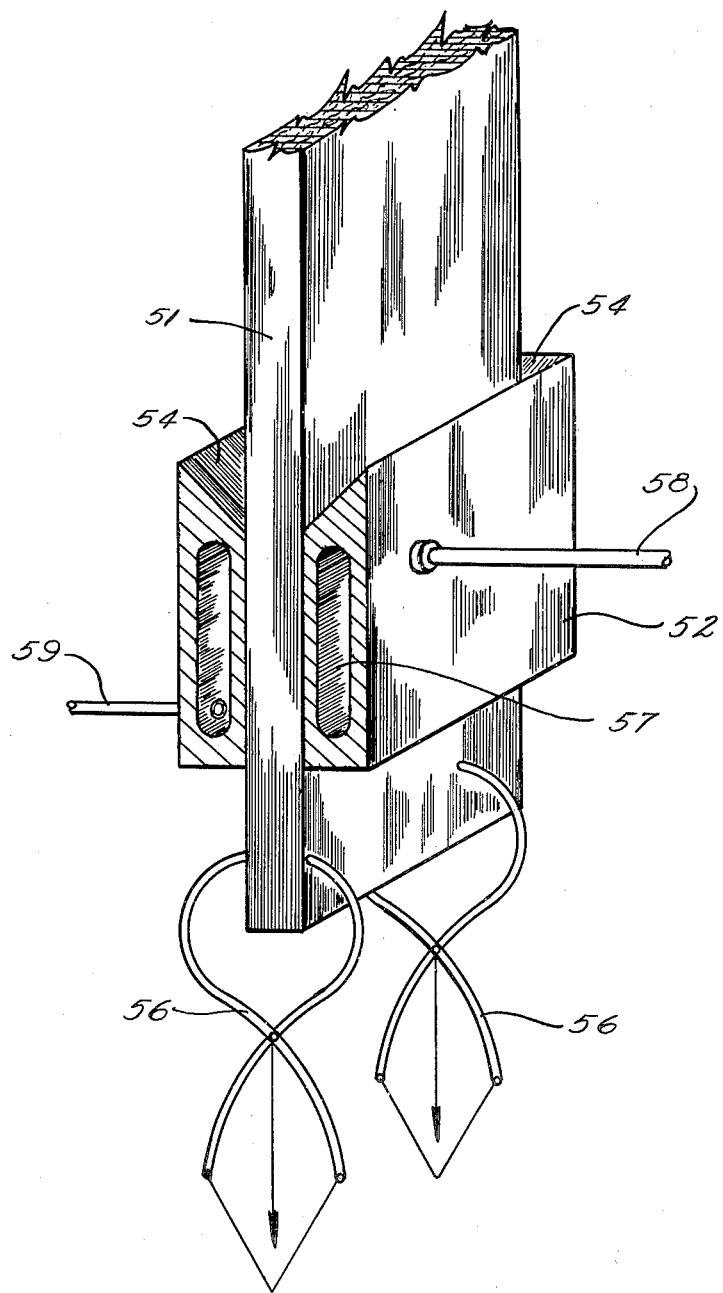
Figure 5 is a diagrammatic view showing the manner of forming a solid article of rectangular cross section.

In Fig. 5, I have shown a modification of the invention wherein the apparatus and method illustrated can be employed for forming articles comprising glass fibres and resin which are solid in cross section rather than tubular. In this instance, the article is rectangular in cross section and a mat 51 comprising relatively short glass fibres interlocked by a resinous binding agent is provided. The mat is slightly larger in width and thickness than the finished or extruded article desired and a die 52 has a rectangular opening therein closely conforming to the cross sectional shape desired in the extruded article. The upper portion of die 52 has outwardly inclined walls 54 whereby when the lower portion of mat 51 is projected into the die 52 a rectangular well will encircle the mat for receiving a liquid bonding agent, such as a suitable thermosetting resin. The lower end portion of mat 51 is first sufficiently reduced in cross section, in any suitable manner as by pressing the fibres together, to permit this portion of the mat to be projected through die 52 so that the mat may be gripped as by a pair of tongs 56. The die is formed with a steam space 57 adapted to receive steam through a supply conduit 58 and to have condensate removed by a conduit 59. After the die has been heated to a desired temperature and the mat 51 projected therethrough and grasped by tongs 56, as illustrated in Fig. 5, liquid resin is supplied to the well formed by the mat and die walls 54 and the mat is drawn through the die. The combined heat and pressure exerted on the mat fibres and resin in passing through the die forms a relatively rigid article having a high tensile strength. The initial binding agent in the mat provides sufficient tensile strength to draw the mat through the die and the length of the extruded article is primarily governed by the amount of vertical space available above the die for the mat and the space available below the die for travel of the tongs 56 or clamp means. The rate of travel of the mat through the die is so controlled that the resin will have sufficient time to thoroughly impregnate the mat and become hardened or permanently set as the mat emerges from the die.

I wish it to be understood that I do not desire to be limited to the exact details of construction shown and described, for obvious modifications will occur to a person skilled in the art.

What I claim is:

1. The method of extruding relatively long and rigid tubular articles having a high tensile strength which comprises providing a vertically reciprocable heated mandrel having an outer wall conforming in cross section to the interior wall of the article, providing a relatively short heated die beneath the mandrel and in vertical alignment therewith having a bore cross section conforming to the outer wall of the article, providing a mat of relatively short glass fibres initially interlocked by a binding agent, disposing the mat to encircle the mandrel and joining the vertically disposed mat ends, clamping the lower portion of the mat to the lower portion of the mandrel, projecting the lower portion of the mat and mandrel partially into the die, disposing a heat hardenable bonding agent in encircling contact with the mat at the upper portion of the die, and forcing the mat through the die by the mandrel to compress the mat fibres and at a rate which will heat harden the bonding agent by the time the mat emerges from the die.

2. The method as decribed in claim 1 and wherein the mandrel is hollow and is connected to a steam line, the die has a steam chamber therein encircling the die bore, and the chamber is connected to a steam line.

3. The method as described in claim 1 and wherein after the mat has been forced completely through the die and the article is formed, fixed abutment means are disposed to engage the upper end of the article, and the mandrel is moved upwardly to strip the article from the mandrel.

References Cited in the file of this patent

UNITED STATES PATENTS

| Number | Name | Date |
|---|---|---|
| 209,686 | House | Nov. 5, 1878 |
| 1,469,342 | Stevens | Oct. 2, 1923 |
| 2,495,640 | Muskat | Jan. 24, 1950 |